United States Patent [19]

Watanabe et al.

[11] Patent Number: 5,139,585
[45] Date of Patent: Aug. 18, 1992

[54] STRUCTURAL MEMBER MADE OF TITANIUM ALLOY HAVING EMBEDDED BETA PHASE OF DIFFERENT DENSITIES AND HARD METALS

[75] Inventors: Naoya Watanabe; Tatsuya Hohda; Toshio Tokune; Yoshihiko Wajima, all of Saitama, Japan

[73] Assignee: Honda Giken Kogyo Kabushiki Kaisha, Tokyo, Japan

[21] Appl. No.: 563,660

[22] Filed: Aug. 7, 1990

[30] Foreign Application Priority Data

Aug. 7, 1989 [JP] Japan ................................. 1-204287
Aug. 11, 1989 [JP] Japan ................................. 1-209454

[51] Int. Cl.$^5$ .......................................... C22C 14/00
[52] U.S. Cl. .................................. 148/421; 75/10.26; 148/902; 420/417
[58] Field of Search ................... 420/417; 148/902, 2, 148/421; 75/10.26; 204/192.16

[56] References Cited

U.S. PATENT DOCUMENTS

| | | | |
|---|---|---|---|
| 4,157,923 | 6/1979 | Yen et al. | 148/4 |
| 4,279,667 | 7/1981 | Anthony et al. | 148/903 |
| 4,639,281 | 1/1987 | Sastry et al. | 420/417 |
| 4,825,035 | 4/1989 | Moriyasu et al. | 148/903 |
| 4,902,359 | 2/1990 | Takeuchi et al. | 149/903 |
| 4,905,538 | 3/1990 | Watanabe et al. | 148/903 |

OTHER PUBLICATIONS

Vigier et al in Titanium & Titanium Alloys vol. 3, eds. Williams et al, Plenum, 1982, p. 1691.

*Primary Examiner*—Upendra Roy
*Attorney, Agent, or Firm*—Lyon & Lyon

[57] ABSTRACT

A structural member made of titanium or titanium alloy has a metal structure at its surface layer portion formed of a plurality of kinds of $\beta$-phases of different characteristics which are present in combination.

14 Claims, 5 Drawing Sheets

STRUCTURAL MEMBER MADE OF TITANIUM ALLOY HAVING EMBEDDED BETA PHASE OF DIFFERENT DENSITIES AND HARD METALS

BACKGROUND OF THE INVENTION

1. Field of the Invention

The field of the present invention is structural members made of titanium or titanium alloy.

2. Description of the Prior Art

There are conventionally known structural members of this type in which a portion thereof requiring slide characteristic is formed of a $\beta$-type titanium alloy having a single $\beta$-phase metal structure (see Japanese Patent Application Laid-open No. 247806/86).

However, although the above $\beta$-type titanium alloy has a slightly improved slide characteristic as compared with an $\alpha$-type and an $\alpha+\beta$-type titanium alloy, it cannot meet the slide characteristic required by a structural member which is used at a high speed and a high surface pressure.

SUMMARY OF THE INVENTION

It is an object of the present invention to provide a structural member made of titanium or titanium alloy of the type described above, which includes a surface layer portion having a combined-type metal structure and excellent in slide characteristic and strength.

To achieve the above object, according to the present invention, there is provided a structural member made of titanium or titanium alloy with a surface layer portion thereof being formed to have a metal structure constructed such that a plurality of kinds of $\beta$-phases of different characteristics are present in combination therein.

When a plurality of kinds of $\beta$-phases of different characteristics are present in the surface layer portion as described above, the slide characteristic of the surface layer portion can substantially be improved as compared with a surface layer portion having a single $\beta$-phase. The surface layer portion thus constructed shows an excellent durability even at a high speed operation and a high surface pressure, and has a substantially improved strength.

According to the present invention, there is also provided a structural member made of titanium or titanium alloy comprising a surface layer portion which is modified by a locally melting alloying process using a high-density energy source, the surface layer portion having a metal structure formed of two phases present in combination: a first $\beta$-phase containing homogeneous solid solution type $\beta$ stabilizing element and a second $\beta$-phase containing an eutectoid type $\beta$ stabilizing element.

If the locally melting alloying process is applied as described above, a rapidly solidifying effect can be obtained by self-cooling after melting and hence, the metal structure of the surface layer portion is made fine and homogeneous. The surface layer portion is formed of two kinds of $\beta$-phases present in combination and hence, has a substantially improved slide characteristic. This ensures that the surface layer portion shows an excellent durability even at a high speed and a high surface pressure and also has a high strength.

The surface layer portion formed by the locally melting alloying process has a strong adhesion to titanium or a titanium alloy as a matrix material and cannot be peeled off when sliding at a high speed and a high surface pressure.

The above and other objects, features and advantages of the invention will become apparent from a reading of the following description of the preferred embodiment, taken in conjunction with the accompanying drawings.

DESCRIPTION OF THE PREFERRED EMBODIMENTS

Figure 1:
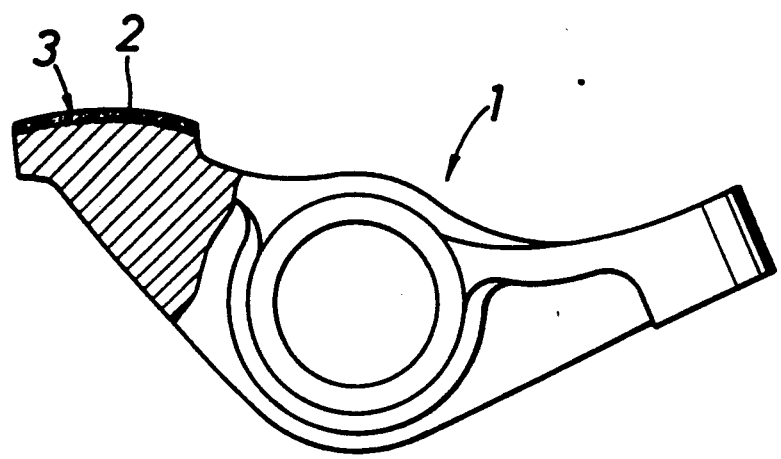
FIG. 1 is a front view of a rocker arm with an essential portion being broken away.

FIG. 1 illustrates a rocker arm 1 as a structural member made of titanium alloy. The rocker arm 1 is used in a valve operating mechanism for an internal combustion engine and is provided at one end thereof with a slipper surface 2 which is in slide contact with a cam.

In producing the rocker arm 1, an $\alpha+\beta$-type titanium alloy blank having a composition of Ti-6Al-4V is used and a surface layer portion 3 constituting the slipper surface 2 is formed by subjecting the blank to a modifying treatment.

A metal structure of the surface layer portion 3 is formed of a plurality of, e.g., two (in the present embodiment) kinds of $\beta$-phases of different characteristics present in combination.

Figure 2:
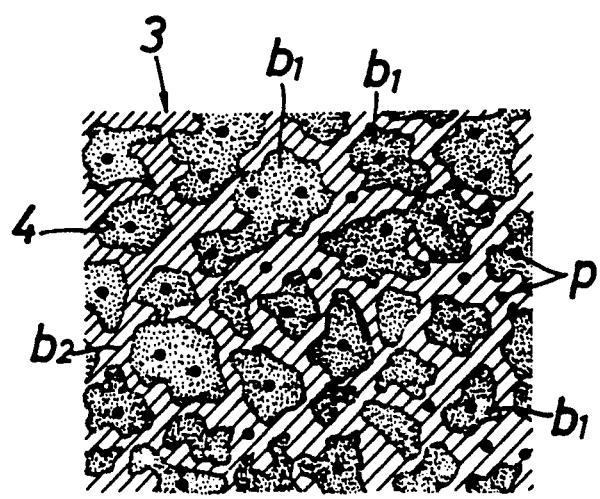
FIG. 2 is a schematic representation of a metal structure of a surface layer portion.

As apparent from a schematic representation of the metal structure shown in FIG. 2, a first $\beta$-phase $b_1$ is distributed into scattered spots, and a second $\beta$-phase $b_2$ is developed in a mesh-like fashion so as to surround the first $\beta$-phase $b_1$. The surface layer portion 3 contains hard particles p uniformly dispersed therein.

In the modifying treatment, a locally melting alloying treatment under a high density energy beam is conducted using a carbide powder of a homogeneous solid solution type $\beta$ stabilizing element and a powder of an eutectoid $\beta$ stabilizing element and therefore, the first $\beta$-phase $b_1$ contains a high density of the homogeneous solid solution type $\beta$ stabilizing element and the second $\beta$-phase $b_2$ contains a high density of the eutectoid $\beta$ stabilizing element.

The homogeneous solid solution type $\beta$ stabilizing element may be at least one of Mo and V. The eutectoid $\beta$ stabilizing element may be at least one selected from the group consisting of Fe, Cr, Mn, Co and Ni.

The homogeneous solid solution type $\beta$ stabilizing element forms a homogeneous solid solution structure in combination with the $\alpha+\beta$-type titanium alloy which is a matrix material. Inclusion of 10% or more by weight of this element ensures that the first β-phase $b_1$ can be brought into room temperature. This element has effects of improving the slide characteristic and heat resistance of the first β-phase $b_1$.

The specified contents of Mo and V to provide these effects are of 10% or more by weight for Mo and 14.9% by weight for V.

However, if the homogeneous solid solution type β stabilizing element is added alone, the first β-phase $b_1$ is low in hardness, only providing an insufficient wear resistance.

Inclusion of 3.5% or more by weight of the eutectoid type β stabilizing element ensures stabilization of the second β-phase $b_2$ and permits precipitation hardening effects to be produced to improve the hardness of the second β-phase $b_2$.

The specified contents of Fe, Cr, Mn, Co and Ni to provide these effects are 3.5% or more by weight for Fe; 6.3% or more by weight for Cr; 6.4% or more by weight for Mn; 7% or more by weight for Co; and 9% or more by weight for Ni.

However, if the content of the eutectoid type β stabilizing element exceeds 40% by weight, a segregation or the like may be produced due to a low solid solution property of this element, and thus a stable second β-phase $b_2$ cannot be obtained. Therefore, the upper limit of the content of this element is set at 40% by weight.

If only the eutectoid type β stabilizing element is added without addition of the homogeneous solid solution type β stabilizing element, an intermetallic compound is formed owing to the above-described precipitation hardening effects, so that the resulting second β-phase $b_2$ tends to be embrittled. This problem can, however, be overcome by using the homogeneous solid solution type β stabilizing element in combination with the eutectoid type β stabilizing element.

Specified examples using Mo as the homogeneous solid solution type β stabilizing element and Fe as the eutectoid type β stabilizing element will be described below.

Figure 3:
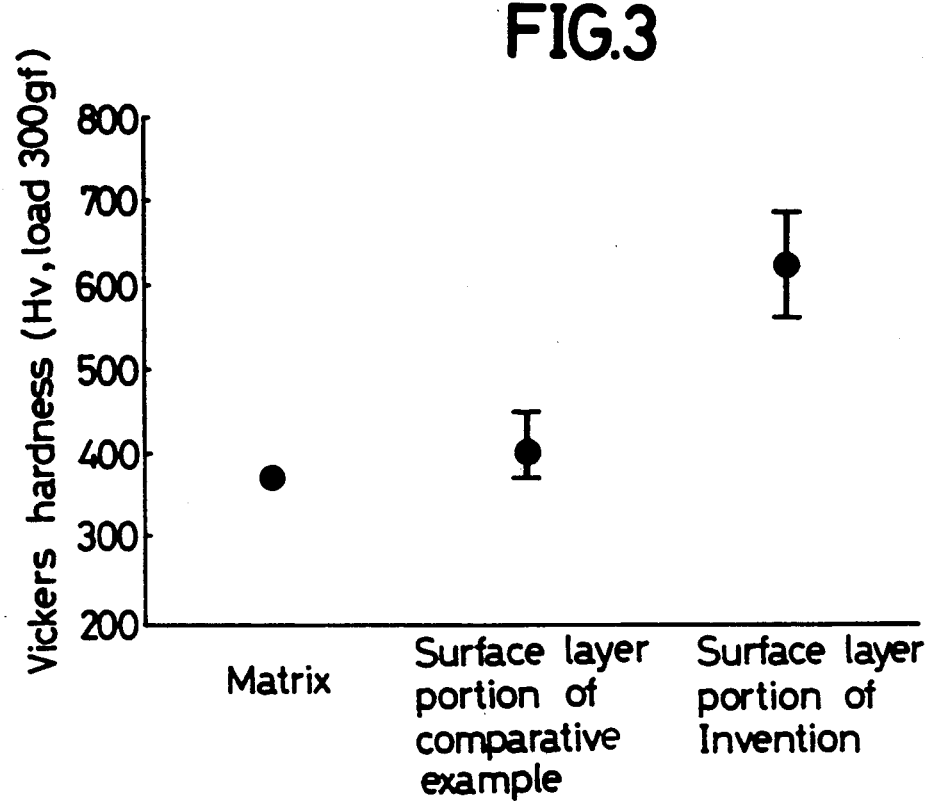
FIG. 3 is a graph illustrating Vickers hardness of the surface layer portion and others.

FIG. 3 is a graph illustrating a comparison in hardness among a matrix (Ti-6Al-4V), a comparative example of surface layer portion comprising the matrix and 26% by weight of Mo contained therein and a surface layer portion according to the present invention comprising the matrix and 26% by weight of Mo and 8% by weight of Fe contained therein.

It can be seen from FIG. 3 that the comparative example of surface layer portion containing only Mo is relatively small in degree of increase in hardness as compared with that of the matrix alone, but if Fe is also contained, the hardness can be substantially increased.

Figure 4:
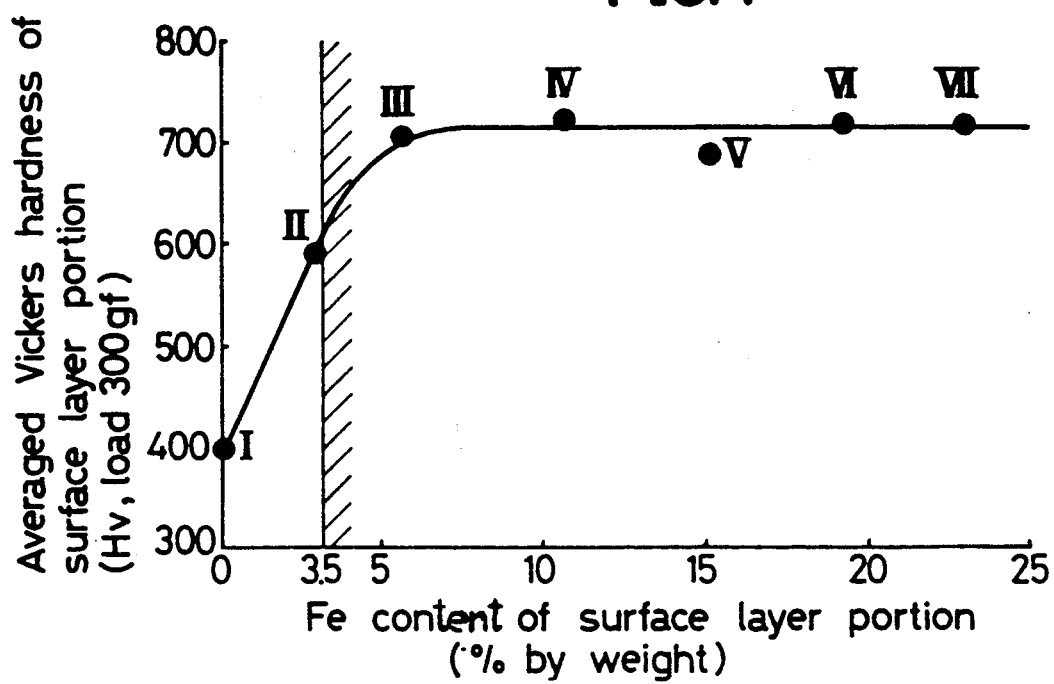
FIG. 4 is a graph illustrating a relationship between the Fe content and averaged Vickers hardness of the surface layer portion.

Table 1 shows an average composition (estimated), an average hardness and a feed ratio of an $Mo_2C$ powder to an Fe powder in each of the surface layer portions, and FIG. 4 is a graph based on Table 1.

TABLE 1

| Surface layer No. | Chemical Composition (% by weight) | | | | | Feed ratio $Mo_2C$/Fe | Av. har. (Hv) |
| --- | --- | --- | --- | --- | --- | --- | --- |
| | Mo | Fe | Al | V | Ti | | |
| I | 37.7 | — | 4.1 | 3.2 | Ba. | 100/0 | 400 |
| II | 34.8 | 2.9 | 4.1 | 3.2 | Ba. | 95/5 | 587.7 |
| III | 32.1 | 5.6 | 4.1 | 3.2 | Ba. | 90/10 | 707.8 |
| IV | 27.1 | 10.6 | 4.1 | 3.2 | Ba. | 80/20 | 721.6 |
| V | 22.6 | 15.1 | 4.1 | 3.2 | Ba. | 70/30 | 686.2 |
| VI | 18.5 | 19.2 | 4.1 | 3.2 | Ba. | 60/40 | 719.5 |
| VII | 14.7 | 23.0 | 4.1 | 3.2 | Ba. | 50/50 | 714.6 |

Av. har. = Average hardness
Ba. = Balance

It can be seen from Table 1 and FIG. 4 that the Fe content should be of 3.5% or more by weight and preferably of 5% or more by weight.

It is desirable that the diameter of a mesh 4 in the second β-phase $b_2$ is as fine as 10 μm or less from the viewpoint of improvements in slide characteristic and strength.

The hard particles p are carbide particles, i.e., TiC particles precipitated through the modifying treatment by reactions: $Mo_2C \rightarrow 2Mo + C$ and $Ti + C \rightarrow TiC$, and the volume fraction (Vf) of the hard particles p is set in a range of from 10% to 30%. The inclusion of the hard particles p insures the hardness of the surface layer portion 3 to provide an improved wear resistance. Thus, the surface layer portion 3 comprising the first and second β-phases $b_1$ and $b_2$ and the hard particles p exhibits a wear resistance equal to or more than that of a conventional iron-based sintered slide member under a sliding condition at a high speed and a high surface pressure.

Because the hard particles p are produced by a precipitation phenomenon, they are fine particles having a particle size of 1 to 5 μm and having a good dispersability and a rounded shape and therefore, have an advantage that their attacking characteristic such as, for example, of increasing the amount of mating slide member worn is low.

In general, in dispersing the hard particles, a pulverized powder is necessarily used in order to provide a particle size of the above-described range, but the pulverized powder has a high attacking characteristic to the mating slide member because of an angular shape thereof and exhibiting an abrasive effect. In addition, in order to achieve a very fine particle size within the abovedescribed range, a precision classification must be conducted, bringing about a considerable increase in cost.

If the volume fraction of the hard particles p is less than 10%, the above-described effects are not obtained. On the other hand, any volume fraction exceeding 30% will lead to an increased attacking characteristic to the mating slide member and to embrittlement of the surface layer portion 3. Further, the hard particles p will be liable to be fallen off the portion 3.

Figure 5:
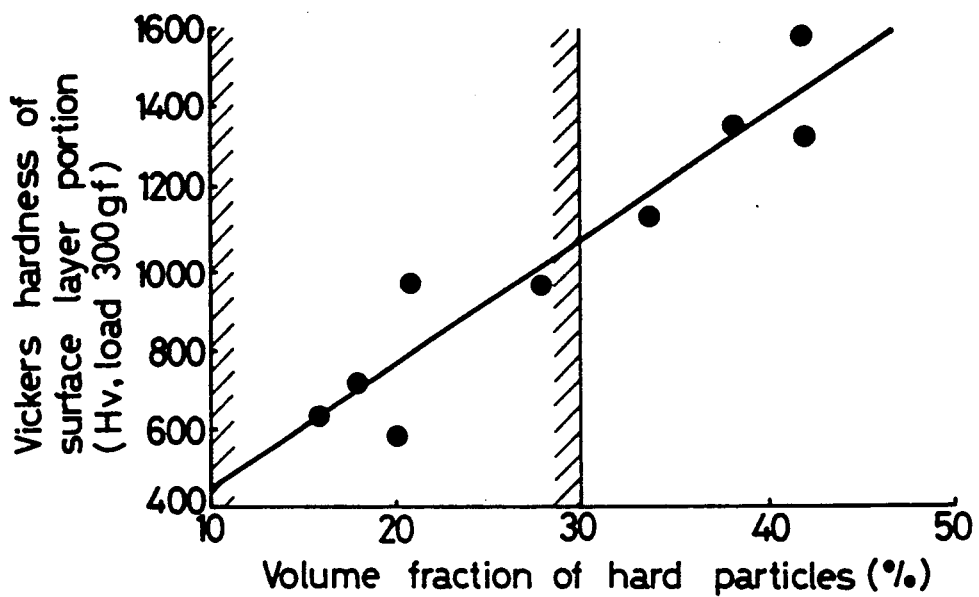
FIG. 5 is a graph illustrating a relationship between the volume fraction and Vickers hardness of hard particles in the surface layer portion.

FIG. 5 illustrates a relationship between the volume fraction (Vf) and Vickers hardness (maximum hardness) of the hard particles p in the surface layer portion 3.

In this case, an α+β-type titanium alloy similar to that described above was used as a matrix, and the amount of $Mo_2C$ powder added was varied to adjust the amount of TiC particles precipitated.

It can be seen from FIG. 5 that the hardness of the surface layer portion 3 is increased as the volume fraction of the hard particles p is increased.

The modifying treatment for the rocker arm 1 will be described below.

Figure 6:
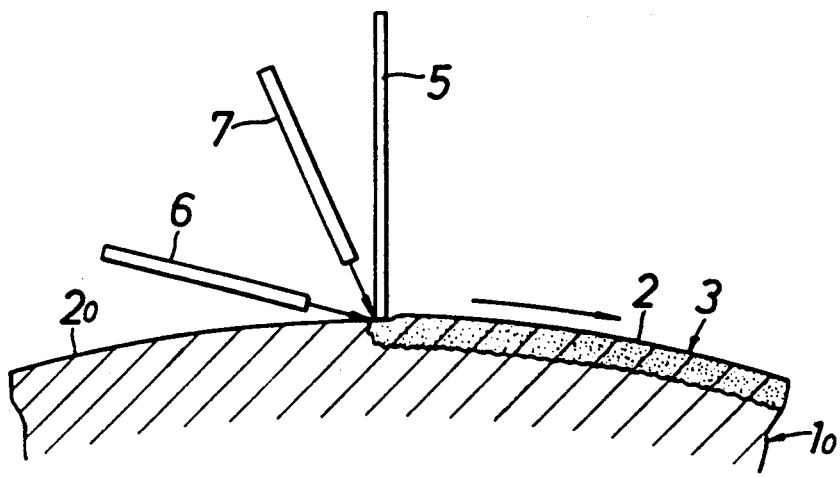
FIG. 6 is a view explaining a modifying process.

FIG. 6 illustrates a modifying process (a locally melting alloying process) which comprises moving a rocker arm blank $1_0$ made of the matrix material (Ti-6Al-4V) in a direction indicated by an arrow, and irradiating a carbon dioxide gas laser from an oscillator 5 to a portion $2_0$ of the blank $1_0$ corresponding to the slipper surface while at the same time supplying a helium gas which serves as a shielding gas from a gas supply nozzle 6 and supplying powders of $Mo_2C$ and Fe from a powder supply nozzle 7.

Modifying conditions are as follows:

Moving rate or speed (treating rate) of the rocker arm blank $1_0$ 300 mm/min.;

The carbon dioxide gas laser: an output power of 5 kW, a spot diameter of 2 mm, an amplitude of 5 mm, and a power density of 5 to $6 \times 10^4$ W/cm$^2$;

The powder of $Mo_2C$: a diameter of 10 to 44 μm; a supply amount of 15.7 g/min.; and the powder of Fe: a purity of 99% or more, a particle size of 200 mesh or less, and a supply amount of 4.6 g/min.

The formation of the surface layer portion 3 is effected via the following first to fourth steps:

A first step: the matrix and the powders of $Mo_2C$ and Fe are molten in a temperature range of 3,200° C. or more. In this case, the reaction of $Mo_2C \rightarrow 2Mo + C$ takes place.

A second step: the reaction of $Ti + C \rightarrow TiC$ takes place in a temperature range of 3,200° C. or less to precipitate TiC particles as hard particles.

A third step: a first β-phase $b_1$ having a high density of Mo starts to be crystallized in a temperature range of about 2,000° C.

A fourth step: a second β-phase $b_2$ having a high density of Fe starts to be crystallized in a temperature range of about 1,400° C.

Figure 7A:
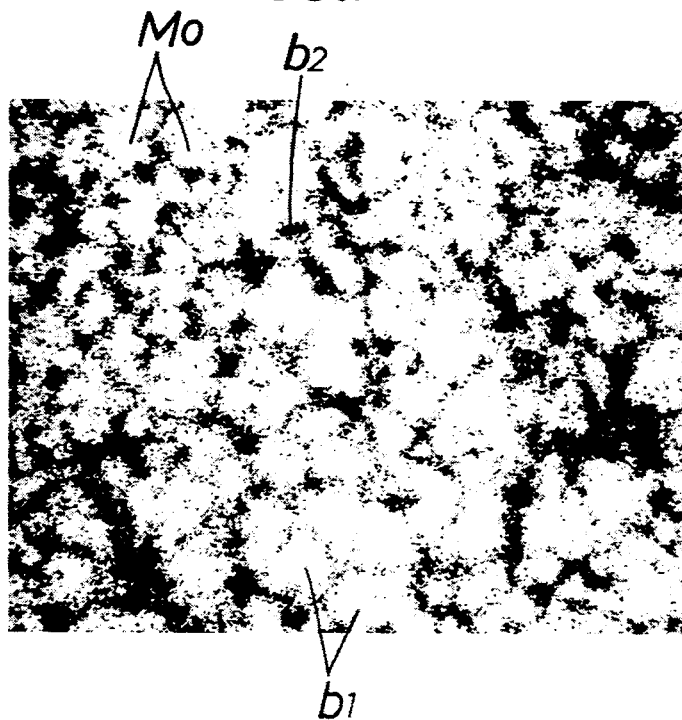
FIG. 7A and 7B are microphotographs each showing a metal structure of the surface layer portion.
Figure 7B:
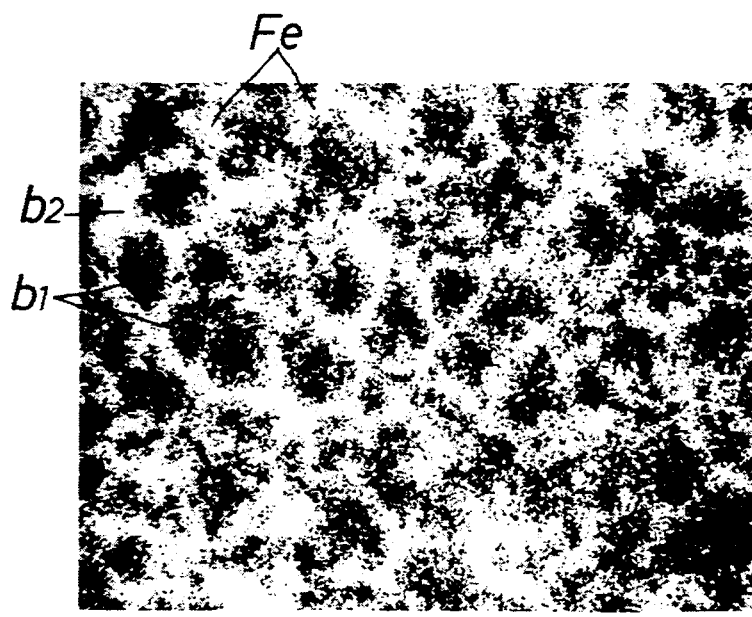

FIGS. 7A and 7B are microphotographs each showing a metal structure of the surface layer portion 3 formed by the above-described modifying treatment, taken by an X-ray microanalyzer (EPMA).

FIG. 7A shows a distribution of Mo, wherein white portions are Mo, and it is seen that the first β-phase $b_1$ having a high density of Mo is distributed into scattered spots.

FIG. 7B shows a distribution of Fe, wherein white portions are Fe, and it is seen that the second β-phase $b_2$ having a high density of Fe is developed in a mesh-like fashion so as to surround the black first β-phase $b_1$ having a high density of Mo.

The mesh-like structure formed by the first β-phase $b_1$ and the second β-phase $b_2$ is produced due to a difference in solidifying point between the phases $b_1$ and $b_2$ at a resolidifying stage, and is formed as a result of the first β-phase $b_1$ of a higher solidifying point having first been crystallized and the second β-phase $b_2$ having then been formed so as to fill gaps defined by the crystallized first β-phase $b_1$.

In the locally melting alloying treatment using a high density energy beam such as a carbon dioxide gas laser, a rapid solidifying effect is provided by self-cooling after melting and hence, the mesh-like structure is made very fine and homogeneous, thereby providing a stable slide characteristic and strength. In addition, the adhesion of the surface layer portion 3 to the matrix is strong.

The reason why the carbide such as $Mo_2C$ is used for the purpose of addition of Mo is that a lower melting point effect of the carbide is aimed at, as will be described hereinafter, in addition to providing precipitation of the TiC particles which are hard particles.

More specifically, a metal Mo is a material having a high melting point of 2,610° C. and if the metal Mo is used as it is, it is difficult to be alloyed with Ti in a titanium alloy having a melting point of 1,668° C. However, if Mo is used in the form of a carbide, the melting point thereof is reduced to about 2,400° C., resulting in a reduced difference in melting point from Ti, which facilitates their alloying.

The carbide powder also has a high heat absorptivity (light absorptivity), as compared with the metal Mo and hence, is convenient even for energy efficiency.

The average composition of the surface layer portion 3 provided by the above-described modifying treatment was Ti-26Mo-11.8Fe-4.1 Al-3.2V; and the average particle size of TiC particles therein was of 2.4 μm, and the volume fraction was of 18.75%.

In this case, the content of Mo in the first β-phase $b_1$ is of 40.5% by weight and the content of Fe therein is of 5.7% by weight and hence, the density of Mo in the first β-phase $b_1$ is higher. On the other hand, the content of Fe in the second β-phase $b_2$ is of 22.4% by weight and the content of Mo therein is of 10.0% by weight and hence, the density of Fe is higher in the second β-phase $b_2$.

Figure 8:
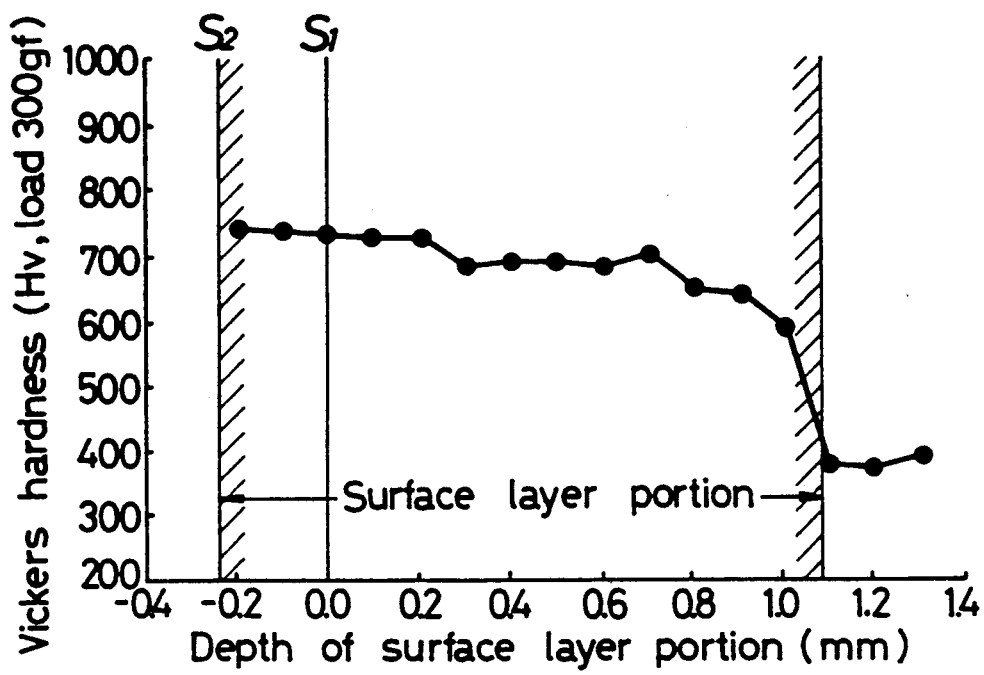
FIG. 8 is a graph illustrating a relationship between the depth and Vickers hardness of the surface layer portion.

FIG. 8 illustrates a relationship between the depth and hardness of the surface layer portion 3. In this Figure, S1 indicates a position of the slipper surface before the modifying treatment, and S2 indicates a position of the slipper surface after the modifying treatment. As apparent, its thickness is slightly increased through the modifying treatment.

It can be seen from FIG. 8 that the hardness (Hv) of the slipper surface 2 shows a value as high as about 750 as a result of the modifying treatment.

Figure 9:
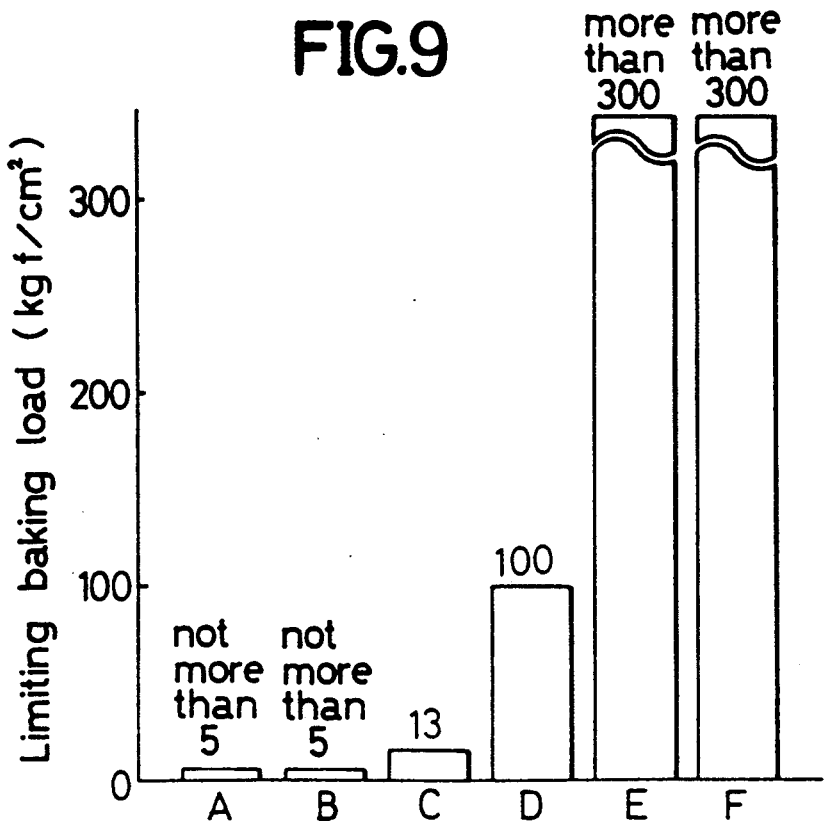
FIG. 9 is a graph illustrating the limiting baking load of the surface layer portion.

FIG. 9 illustrates results of a slide test for various chip materials constituting conventional surface layer portion and the slipper surface 3 according to the present invention. Table II shows types of materials for various test pieces A to F in FIG. 9.

TABLE II

| Test piece | Type of material |
| --- | --- |
| A | Industrial pure titanium (α-type) |
| B | Ti—6Al—4V (α + β-type titanium alloy) |
| C | Ti—15Mo—5Zr—3Al (β-type titanium alloy which is a conventional material) |
| D | WC particle-dispersed Ti—6Al—4V (α + β-type titanium alloy) |
| E | Material according to the invention (as described above) |
| F | High-Cr iron-based sintered material |

The slide test was conducted in a chip-on-disc style, and test conditions were as follows: The material of a disk was a structural steel (JIS SCM 420H) carburized; slide rate . . . 7.5 m/sec.; load . . . increased at 10 kg/min from 0 to 300 kg f; lubricating oil . . . trade name 10W-30, ultra U, made by Shows Shell Petroleum, Co., Ltd.; and amount of lubricating oil supplied . . . 11 cc/min (at room temperature).

The limiting (critical) baking load was determined by finding a load when the text piece was baked in response to increase of the above-described load.

As apparent from FIG. 9, the limiting baking load is equal to or more than 300 kg f in the present invention which corresponds to that of the conventional high-Cr iron-based sintered material.

For the locally melting alloying process, it is possible to use a pre-place process in which a powder is previously placed on that portion $2_0$ of the blank $1_0$ which corresponds to the slipper surface.

The present invention is also applicable to a titanium made structural member.

What is claimed is:

1. A structural member made of titanium or titanium alloy comprising a surface layer portion having a metal structure formed of a plurality of kinds of $\beta$-phases of different characteristics present in combination.

2. A structural member made of titanium or titanium alloy according to claim 1, wherein said metal structure is formed of a first $\beta$-phase distributed into scattered spots and a second $\beta$-phase developed in a mesh-like pattern so as to surround the first $\beta$-phase.

3. A structural member made of titanium or titanium alloy according to claim 2, wherein the diameter of a mesh of said second $\beta$-phase is of not more than 10 $\mu$m.

4. A structural member made of titanium or titanium alloy according to claim 2, wherein said first and second $\beta$-phases are obtained through a resolidifying process, respectively, said first $\beta$-phase having been solidified at a temperature higher than said second $\beta$-phase.

5. A structural member made of titanium or titanium alloy according to claim 3, wherein said first $\beta$-phase contains not less than 10% by weight of Mo, and said second $\beta$-phase contains not less than 3.5% but not more than 40% by weight of Fe.

6. A structural member made of titanium or titanium alloy according to claim 5, wherein said surface layer portion contains hard particles uniformly dispersed therein, a volume fraction of said hard particles being of not less than 10% but not more than 30%.

7. A structural member made of titanium or titanium alloy according to claim 6, wherein said structural member is a rocker arm for an internal combustion engine, and said surface layer portion forms a slipper surface.

8. A structural member made of titanium or titanium alloy according to claim 6, wherein said Mo is added in the form of a carbide and said hard particles are TiC particles which have been obtained by a reaction between said carbide and titanium or titanium alloy as a matrix material of the structural member.

9. A structural member made of titanium or titanium alloy comprising a surface layer portion modified by a locally melting alloying process using a high-density energy source, said surface layer portion having a metal structure formed of two phases present in combination: a first $\beta$-phase containing a homogeneous solid solution type $\beta$ stabilizing element and a second $\beta$-phase containing an eutectoid type $\beta$ stabilizing element.

10. A structural member made of titanium or titanium alloy according to claim 9, wherein the content of said homogeneous solid solution type $\beta$ stabilizing element is of not less than 10% by weight and the content of said eutectoid type $\beta$ stabilizing element is of not less than 3.5% but not more than 40% by weight.

11. A structural member made of titanium or titanium alloy according to claim 10, wherein said homogeneous solid solution type $\beta$ stabilizing element is at least one of Mo and V, and said eutectoid type $\beta$ stabilizing element is at least one selected from the group consisting of Fe, Cr, Mn, Co and Ni.

12. A structural member made of titanium or titanium alloy according to claim 11, wherein said surface layer portion contains hard particles uniformly dispersed therein, said hard particles having a volume fraction of not less than 10% but not more than 30% by weight.

13. A structural member made of titanium or titanium alloy according to claim 12, wherein said structural member is a rocker arm for an internal combustion engine, and said surface layer portion forms a slipper surface.

14. A structural member made of titanium or titanium alloy according to claim 12, wherein said Mo is added in the form of a carbide and said hard particles are TiC particles which have been obtained by a reaction between said carbide and titanium or titanium alloy as a matrix material of the structural member.

* * * * *